(12) United States Patent
Lin et al.

(10) Patent No.: US 12,272,097 B1
(45) Date of Patent: Apr. 8, 2025

(54) CAMERA POSE ESTIMATION METHOD AND SYSTEM, ELECTRONIC EQUIPMENT AND READABLE MEDIUM

(71) Applicants: Jinan University, Guangzhou (CN); Macalester College, St. Paul, MN (US)

(72) Inventors: Shuyuan Lin, Guangzhou (CN); Xiaocheng Lin, St. Paul, MN (US); Feiran Huang, Guangzhou (CN); Tingrong Zhi, Guangzhou (CN)

(73) Assignees: Jinan University;, Guangzhou (CN); Macalester College, St. Paul, MN (US)

( * ) Notice: Subject to any disclaimer, the term of this patent is extended or adjusted under 35 U.S.C. 154(b) by 0 days.

(21) Appl. No.: 18/911,702

(22) Filed: Oct. 10, 2024

(30) Foreign Application Priority Data

Nov. 7, 2023 (CN) .......................... 202311472686.X

(51) Int. Cl.
*G06T 7/73* (2017.01)
*G06T 7/33* (2017.01)

(52) U.S. Cl.
CPC .............. *G06T 7/74* (2017.01); *G06T 7/337* (2017.01); *G06T 2207/20076* (2013.01); *G06T 2207/30244* (2013.01)

(58) Field of Classification Search
None
See application file for complete search history.

(56) References Cited

FOREIGN PATENT DOCUMENTS

| | | |
|---|---|---|
| CN | 110335337 A | 10/2019 |
| CN | 112489098 A | 3/2021 |
| CN | 114170202 A | 3/2022 |

OTHER PUBLICATIONS

S. Lin, X. Chen, G. Xiao, H. Wang, F. Huang and J. Weng, "Multi-Stage Network With Geometric Semantic Attention for Two-View Correspondence Learning," in IEEE Transactions on Image Processing, vol. 33, pp. 3031-3046, 2024, doi: 10.1109/TIP. 2024.3391002. (Year: 2024).*
J. Zhang et al., "Learning two-view correspondences and geometry using order-aware network," in Proc. IEEE/CVF Int. Conf. Comput. Vis. (ICCV), Oct. 2019, pp. 5845-5854. (Year: 2019).*
J. Hu, L. Shen, and G. Sun, "Squeeze-and-excitation networks," in Proc. IEEE Conf. Comput. Vis. Pattern Recognit., Jul. 2018, pp. 7132-7141. (Year: 2018).*

* cited by examiner

*Primary Examiner* — Ian L Lemieux
(74) *Attorney, Agent, or Firm* — Nitin Kaushik

(57) ABSTRACT

The present invention relates to the field of artificial intelligence, and in particular, to a camera pose estimation method and system, electronic equipment and a readable medium. The camera pose estimation method includes: acquiring an initial matching set between a first image and a second image, where the first image and the second image are images from different angles for a same scene; performing a mismatch removal operation on the initial matching set based on an optimization network to obtain an optimized matching set, where the optimization network is constructed based on a multi-stage geometric semantic attention network; and acquiring a camera pose result based on the optimized matching set. By removing mismatches, feature matching results between the first image and the second image are more accurate, and thus a more accurate result can be obtained when performing camera pose estimation.

10 Claims, 6 Drawing Sheets

Acquire an initial matching set between a first image and a second image, where the first image and the second image are images from different angles for a same scene;

Perform a mismatch removal operation on the initial matching set based on an optimization network to obtain an optimized matching set, where the optimization network is constructed based on a multi-stage geometric semantic attention network;

Acquire a camera pose result based on the optimized matching set.

FIG. 1

CAMERA POSE ESTIMATION METHOD AND SYSTEM, ELECTRONIC EQUIPMENT AND READABLE MEDIUM

CROSS-REFERENCE TO RELATED APPLICATIONS

The application claims priority to Chinese patent application No. 202311472686.X, filed on Nov. 7, 2023, the entire contents of which are incorporated herein by reference.

TECHNICAL FIELD

The present invention relates to the field of artificial intelligence, and in particular, to a camera pose estimation method and system, electronic equipment and a readable medium.

BACKGROUND

In recent years, with the rapid development of artificial intelligence, more and more artificial intelligence applications have begun to serve human beings. Computer vision, as an important branch of the field of artificial intelligence, plays a pivotal role in both relatively mature technologies such as face recognition, OCR character recognition, and image retrieval, and rapidly developing technologies such as automatic driving, robot visual perception, and three-dimensional (3D) reconstruction. In the sense of computer vision itself, the ultimate goal of human beings is to allow machines to obtain visual perception capabilities like or even beyond those of human beings, so as to better serve human beings. Recognizing differences and connections between a plurality of visual targets is still an important challenge for computer vision perception, and is also an underlying task of many computer vision applications and one of the current research hotspots. As an important technology of computer vision, image feature matching aims to establish point-to-point correspondence among images of the same scene obtained at different times, with different sensors, from different visual angles, and under different shooting conditions, which is a basic process of recognizing the differences and connections between the plurality of visual targets, and is also a link leading computer vision from low level to high level.

Image feature matching is widely used in many fields, including medical image detection, computer vision, remote sensing, military, pattern recognition, 3D reconstruction, target tracking and detection, simultaneous localization and mapping, and virtual reality, etc. Feature matching is the underlying basis of these applications. In 3D reconstruction, feature matching is a key step of 3D reconstruction, and the accuracy of matching determines the effect of 3D reconstruction to a great extent. In simultaneous localization and mapping applications, a camera pose can be effectively estimated through accurate feature matching, and a complete 3D map can be further constructed. It can be seen that feature matching is the link leading computer vision from low dimension to high dimension.

A conventional process of image feature matching includes: extracting feature points of an image by using a feature point extraction algorithm, then performing feature matching with a feature matching algorithm, and finally, performing mismatch removal with a mismatch removal algorithm. Feature matching is the basis of many upper-layer applications, and is also a great constraint on the development of upper-layer applications. Due to the influence of illumination, resolutions, angles, and different sensor parameters, etc., it is a huge challenge to obtain accurate matching results, especially in the case of wide baselines and large variations of light and dark, the results of existing feature matching algorithms are unsatisfactory.

SUMMARY

In view of the shortcomings of the prior art, the present invention aims to provide a camera pose estimation method and system, electronic equipment and a readable medium, for improving an effect of feature matching, and thereby achieving a better effect of camera pose adjustment.

To achieve the foregoing purpose, the present invention adopts the following technical solution:

On one hand, the present invention provides a camera pose estimation method, including:
  acquiring an initial matching set between a first image and a second image, where the first image and the second image are images from different angles for a same scene;
  performing a mismatch removal operation on the initial matching set based on an optimization network to obtain an optimized matching set, where the optimization network is constructed based on a multi-stage geometric semantic attention network; and
  acquiring a camera pose result based on the optimized matching set.

Further, the multi-stage geometric semantic attention network includes a plurality of stage networks sequentially connected in series; adjacent stage networks are connected to each other through a geometric transformation consistency module and a geometric semantic attention module.

The performing a mismatch removal operation on the initial matching set based on an optimization network to obtain an optimized matching set specifically includes:
  acquiring probability data of the initial matching set based on the stage networks, where the probability data includes a correct matching probability of each matching pair in the initial matching set; input data of each of the stage networks is the initial matching set, and input data of posterior stage networks is also fused with geometric transformation consistency information output by the geometric transformation consistency module and geometric semantic neighbor information output by the geometric semantic attention module; and
  optimizing an initial matching pair set based on probability data output by a final stage network to obtain the optimized matching set.

Further, the acquiring probability data of the initial matching set based on the stage networks specifically includes:
  acquiring a first spatial transformation feature of the initial matching set;
  performing a sequential perception filtering operation on the first spatial transformation feature to acquire a second spatial transformation feature corresponding to the first spatial transformation feature; and
  obtaining the correct matching probability of each matching pair in the initial matching set based on the second spatial transformation feature.

Further, a step of acquiring the geometric transformation consistency information includes:
  extracting the geometric transformation consistency information of the output data of the previous stage network based on the geometric transformation consistency module.

Further, a step of acquiring the geometric semantic neighbor information includes:
dividing all matching pairs in the input data of the next stage network into k categories based on probability data output by the previous stage network, where the matching pairs in each category are neighbors to each other;
constructing a category graph for each category, the category graph including a plurality of category nodes;
aggregating neighbor information of various categories to the category nodes; and
performing an attention operation on all category nodes by a converter model, and performing a channel refinement operation by a channel attention module to obtain the geometric semantic neighbor information.

Further, the acquiring a camera pose result based on the optimized matching set specifically includes:
using an eight-point weight algorithm to calculate an essential matrix to estimate a camera pose in combination with probabilities of the matching pairs.

Further, a plurality of feature point coordinates and corresponding feature descriptors for the first image and the second image are acquired respectively; a similarity between each feature point between the first image and the second image is obtained based on the feature descriptors, matching is performed according to the similarity to obtain a plurality of matching pairs, and the initial matching set is further generated.

On the other hand, the present invention provides a camera pose estimation system, including:
an acquisition module, configured to acquire an initial matching set between a first image and a second image, where the first image and the second image are images from different angles for a same scene;
an optimization module, configured to perform a mismatch removal operation on the initial matching set based on an optimization network to obtain an optimized matching set, where the optimization network is constructed based on a multi-stage geometric semantic attention network; and
a processing module, configured to acquire a camera pose result based on the optimized matching set.

On the other hand, the present invention provides electronic equipment, including:
a memory, having a computer program stored; and
a processor, configured to implement the camera pose estimation method when executing the computer program.

On the other hand, the present invention provides a computer-readable medium, having a computer program stored, where the computer program, when executed by a processor, implements the camera pose estimation method.

Compared with the prior art, the camera pose estimation method and system, the electronic equipment and the readable medium provided by the present invention have the following beneficial effects:

With the use of the camera pose estimation method provided by the present invention, the optimization network constructed based on the multi-stage geometric semantic attention network is adopted to perform a mismatch removal operation on the initial matching set, thereby obtaining an optimized matching set after removing the mismatches; further, camera pose estimation is performed based on the optimized matching set. By removing the mismatches, feature matching results between the first image and the second image are more accurate, and thus a more accurate result can be obtained when performing camera pose estimation.

BRIEF DESCRIPTION OF THE DRAWINGS

FIG. 1 is a flowchart of a camera pose estimation method provided by the present invention.

DETAILED DESCRIPTION OF THE EMBODIMENTS

To make the purposes, technical solutions, and effects of the present invention clearer and more explicit, the following further describes the present invention in detail with reference to the accompanying drawings and by way of embodiments. It should be understood that, specific embodiments described herein are merely used to explain the present invention but not to limit the present invention.

It should be understood by those skilled in the art that the general description above and the detailed description below are exemplary and illustrative specific embodiments of the present invention and are not intended to limit the present invention.

The terms "include", "comprise", or any other variants thereof herein are intended to cover non-exclusive inclusion, so that a process or method including a list of steps includes not only those steps but also other steps not explicitly listed or inherent to such process or method. Similarly, without further limitations, one or more equipment or subsystems, elements or structures or components starting with "including one of . . . " will not have further limitations, excluding the presence of other equipment or other subsystems or other elements or other structures or other components or other equipment or other subsystems or other elements or other structures or other components. Throughout the description, occurrences of the phrases "in one embodiment", "in another embodiment", and similar language may, but do not necessarily, all refer to the same embodiment.

Unless otherwise defined, all technical and scientific terms used herein have the same meanings as those commonly understood by those of ordinary skill in the art to which the present invention belongs.

Figure 2:
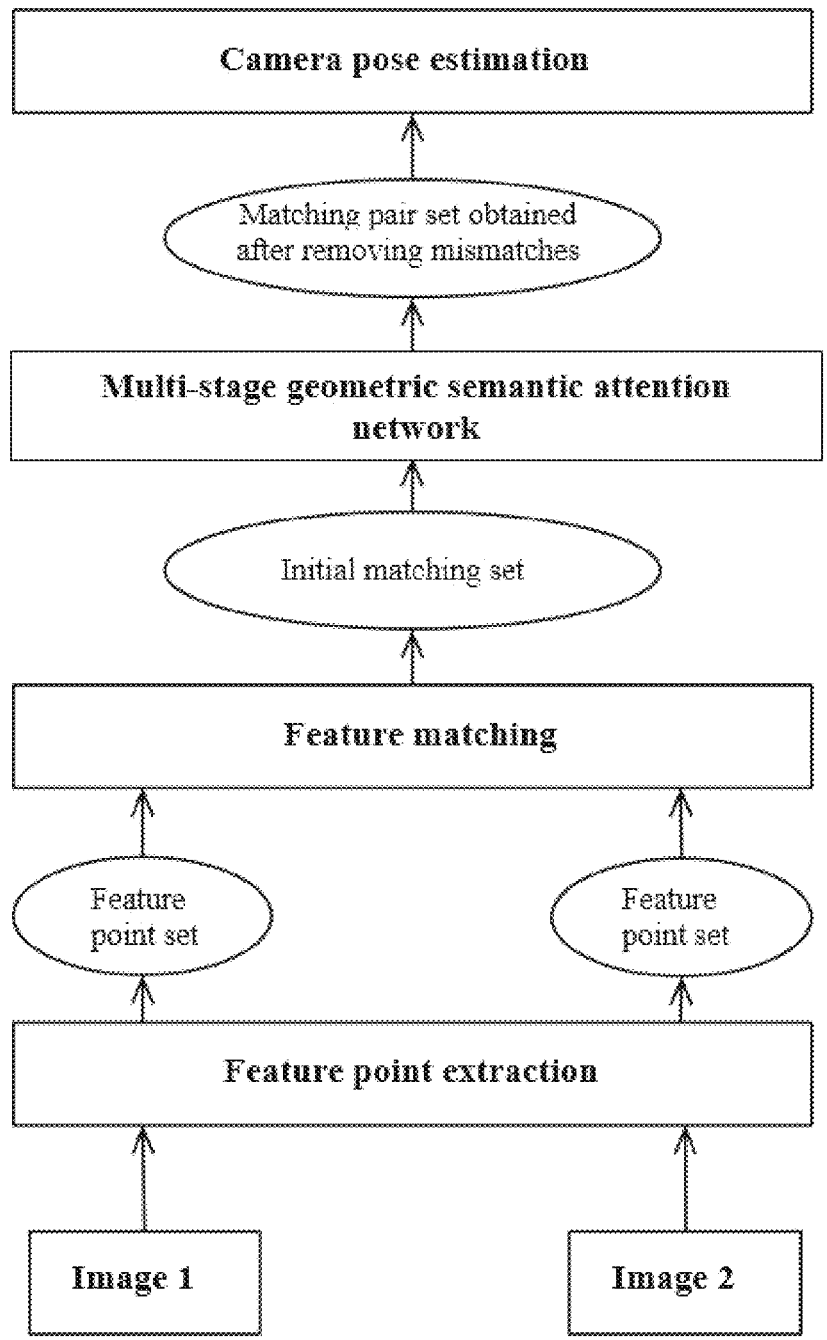
FIG. 2 is a schematic flowchart of performing camera pose estimation by a camera pose estimation system provided by the present invention.

Referring to FIG. 1-FIG. 2, the present invention provides a camera pose estimation method, including:
acquiring an initial matching set between a first image and a second image, where the first image and the second image are images from different angles for a same scene; specifically, in this embodiment, a step of acquiring the initial matching set between two images is not limited, and those skilled in the art may adopt a corresponding algorithm to realize the step according to actual needs.
performing a mismatch removal operation on the initial matching set based on an optimization network to obtain an optimized matching set, where the optimization network is constructed based on a multi-stage geometric semantic attention network; and acquiring a camera pose result based on the optimized matching set.

With the use of the camera pose estimation method provided by the present invention, the optimization network constructed based on the multi-stage geometric semantic attention network is adopted to perform a mismatch removal operation on the initial matching set, thereby obtaining an optimized matching set after removing the mismatches; further, camera pose estimation is performed based on the optimized matching set. By removing the mismatches, feature matching results between the first image and the second image are more accurate, and thus a more accurate result can be obtained when performing camera pose estimation.

Figure 3:
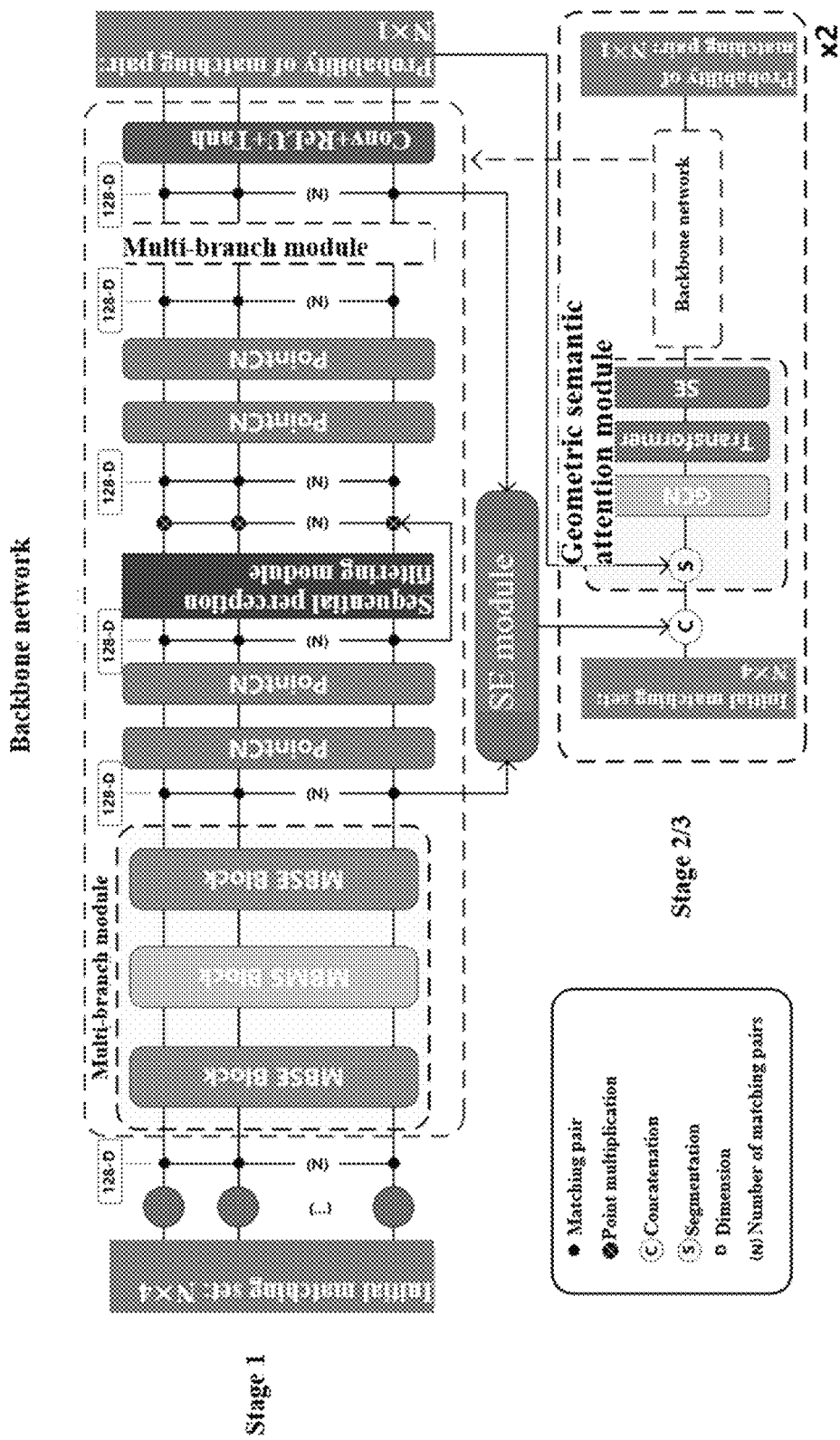
FIG. 3 is a structural block diagram of a multi-stage geometric semantic attention network provided by the present invention.

Further referring to FIG. 3, as a preferred solution, in this embodiment, the multi-stage geometric semantic attention network includes a plurality of stage networks sequentially connected in series; and adjacent stage networks are connected to each other through a geometric transformation consistency module and a geometric semantic attention module. It should be noted that in this embodiment, the connection through the geometric transformation consistency module and the geometric semantic attention module, namely, input data of the stage network after a column between the adjacent stage networks is obtained by processing output data of the previous stage network through the geometric transformation consistency module and the geometric semantic attention module, so that the input data of the stage network after the column has geometric transformation consistency information and geometric semantic neighbor information.

In some embodiments, the geometric transformation consistency module and the geometric semantic attention module are accessed between two stage networks after being connected in series.

In some embodiments, the geometric transformation consistency module and the geometric semantic attention module may be accessed between the two stage networks in other structural forms. The other structural forms include a parallel connection mode, or the geometric semantic attention module and the geometric transformation consistency module being sequentially connected in series.

The performing a mismatch removal operation on the initial matching set based on an optimization network to obtain an optimized matching set specifically includes:

acquiring probability data of the initial matching set based on the stage networks, where the probability data includes a correct matching probability of each matching pair in the initial matching set; input data of each of the stage networks is the initial matching set, and input data of posterior stage networks is also fused with geometric transformation consistency information output by the geometric transformation consistency module and geometric semantic neighbor information output by the geometric semantic attention module; specifically, the geometric transformation consistency information and input features are first concatenated in a channel dimension to obtain a feature f1=concat (x1, x2), where x1 represents an input feature, and x2 represents a geometric transformation consistency feature. The feature f1 is input into the geometric semantic attention module to obtain a feature f2 fused with the geometric semantic neighbor information. An operation process of the geometric semantic attention module is as follows: the feature f1 is divided into k sets based on the probability of matching pairs output in a previous stage, and matching pair nodes between each set are neighbors to each other. Then, a category graph $G_i=(V_i, E_{ij})$ is constructed for each set, where $V_i$ represents a category node of the category graph, and $E_{ij}$ represents an edge between the category node and the $j^{th}$ matching pair node in the set. Information of all matching pair nodes in the category graph is aggregated to the category node $T_i=avg(\Sigma D_{ij})$, where $T_i$ represents a category node feature after aggregating all the matching pair nodes in the category graph, $D_{ij}$ represents a $j^{th}$ matching pair node feature in a category i, and avg represents averaging. Next, attention operations are performed between all category nodes, and then channel refinement is performed through an SE module, and finally, the obtained features are fused into all matching pair nodes in the corresponding category graph, so that all the matching pair nodes fuse both semantic neighbor information and global information.

Optimizing an initial matching pair set based on probability data output by a final stage network to obtain the optimized matching set.

In some embodiments, the preferred number of the stage networks is three, and each of the stage networks outputs once the probability data of accurate matching for each matching pair. Further, the input data of each of the stage networks is an initial matching set. The difference is that input data of a first stage network is an original initial matching set, while input data of a posterior stage network is an initial matching set processed by the geometric transformation consistency module and the geometric semantic attention module. When processing the initial matching set, the geometric transformation consistency module and the geometric semantic attention module perform processing based on the probability data output by the previous stage network. Therefore, probability data output by the subsequent stage network may include geometric transformation consistency information and geometric semantic neighbor information, making the correct matching probability of each matching pair in the obtained initial matching set more accurate.

Referring to FIG. 3 for details, in some embodiments, the multi-stage geometric semantic attention network includes three stage networks, and each stage includes a first multi-branch module (i.e., a first multi-branch module from left to right in the stage 1 portion of FIG. 3), a sequential perception filtering module, and a second multi-branch module (i.e., a second multi-branch module from left to right in the stage 1 portion of FIG. 3) that are sequentially connected in series.

The acquiring probability data of the initial matching set based on the stage networks specifically includes:

S21. acquiring a first spatial transformation feature of the initial matching set; specifically, the first multi-branch module being configured to acquire the first spatial transformation feature of the initial matching set;

S22. performing a sequential perception filtering operation on the first spatial transformation feature to acquire a second spatial transformation feature corresponding to the first spatial transformation feature; specifically, the step is that the sequential perception filtering module is configured to process the first spatial transformation feature through two Point CN layers, and then a clustering operation on a matching pair set is performed by using a differentiable pooling operation to obtain a plurality of clusters, each cluster contains information of all matching pairs; all clusters are subjected to a sequential perception filtering operation, and filtered clusters are restored to original shapes before pooling by performing a differentiable de-pooling operation.

In some embodiments, the clustering operation specifically includes: dividing the matching pair set into 500 clusters, each cluster containing information of all matching pairs; performing sequential perception filtering on the 500 clusters through the sequential perception filtering module, and restoring clustered clusters to original shapes before pooling by performing a differentiable de-pooling operation.

In some embodiments, the second spatial transformation feature corresponding to the first spatial transformation feature is acquired through the second multi-branch module.

Further, two Point CN layers are arranged between the sequential perception filtering module and the second multi-branch module. The first spatial transformation feature is processed by the two Point CN layers before being transmitted to the second multi-branch module.

S23. Obtaining the correct matching probability of each matching pair in the initial matching set based on the second spatial transformation feature.

Specifically, this step includes: mapping the second spatial transformation feature to 1 dimension by using 1×1 convolution, and then obtaining the correct matching probability of each matching pair in the initial matching set through tanh and relu activation functions.

Figure 4:
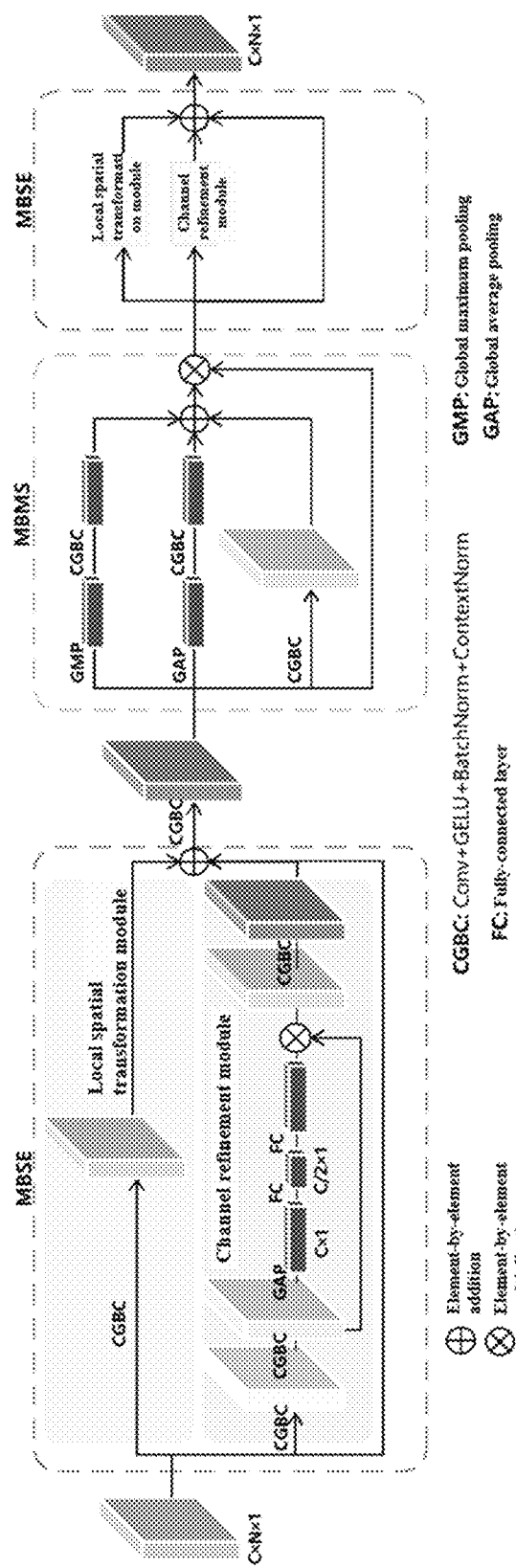
FIG. 4 is a structural block diagram of a multi-branch module provided by the present invention.

Referring to FIG. 4, in some embodiments, the first multi-branch module and the second multi-branch module have the same structure and are constructed using a multi-branch structure. The obtained multi-branch structure includes first transformation modules MBSE and a second transformation module MBMS, and the specific structure thereof includes a first transformation module MBSE, a second transformation module MBMS, and a first transformation module MBSE that are sequentially connected in series.

The first transformation module MBSE is configured to acquire channel refinement features and local spatial features of each matching pair of the initial matching set. A specific operation is as follows: each matching pair feature of the initial matching set consists of coordinates of corresponding feature points, specifically, the matching pair features are first upgraded from 4 dimensions to 128 dimensions by 1×1 convolution; and the matching pair features with upgraded dimensions are subjected to channel refinement and local spatial transformation. A specific operation of channel refinement includes: first squeezing N matching pairs in the matching set into channel weight blocks containing 128-dimensional channels by using global average pooling, then exciting the channel weight blocks through an excitation operation, and finally performing point multiplication on the channel weight and features before squeezing to complete channel refinement. A specific operation of local spatial transformation includes using a CGBC operation to complete the local spatial transformation.

Specifically, a channel refinement formula is as follows:

$$v = F_{sq}(u) = \frac{1}{N \times 1} \sum_{i=1}^{N} \sum_{j=1}^{1} u(i, j),$$

$$h = F_{ex}(v) = \sigma(W_2 \delta(W_1 v))$$

In the formula, $u \in \mathbb{R}^{N \times 1 \times C}$ represents an input of the channel refinement module, N represents the number of the matching pairs, C represents a feature channel of each matching pair; $V \in \mathbb{R}^{1 \times 1 \times C}$ represents an output of a squeezing operation $F_{sq}$; $F_{ex}$ represents an excitation operation, containing two linear layers $W_1 \in \mathbb{R}^{C/r \times C}$ and $W_2 \in \mathbb{R}^{C \times C/r}$, where r represents a channel reduction rate; $\sigma$ represents a Sigmoid function, $\delta$ represents a ReLU activation function; and h represents an output of the excitation operation.

A specific operation of performing global spatial transformation by the second transformation module MBMS includes: first performing global information aggregation on the matching pair set by using global maximum pooling or global average pooling, then completing global spatial transformation through a CGBC operation, and finally, fusing features obtained by two global space transformations with features obtained by a local space transformation using an addition operation.

Specifically, the point multiplication formula is as follows:

$$q = F_b(GAP(e)) + F_b(GMP(e)) + F_b(e),$$

$$f = q \cdot e$$

In the formula, $F_b$ represents a CGBC operation, GAP represents global average pooling, GMP represents global maximum pooling, e represents input features, q represents output features, and f represents features obtained by performing point multiplication on the input features and q.

Feature data obtained after processing by the first multi-branch module (i.e., input data received by the first multi-branch module is sequentially processed by MBSE-MBMS-MBSE) is called the first spatial transformation feature. Feature data obtained after processing by the second multi-branch module (i.e., input data received by the second multi-branch module is sequentially processed by MBSE-MBMS-MBSE) is called the second spatial transformation feature.

Further, as a preferred solution, in this embodiment, a step of acquiring the geometric transformation consistency information includes:

extracting the geometric transformation consistency information of the output data of the previous stage network based on the geometric transformation consistency module.

It should be noted that in some embodiments, the geometric transformation consistency module extracts geometric transformation consistency information of a process of transforming the first spatial transformation feature to the second spatial transformation feature. A formula thereof is described as follows: x2=SE(concat(m1,m2)). In the formula, x2 represents the extracted geometric transformation consistency information, m1 represents the first spatial transformation feature, m2 represents the second spatial transformation feature, Concat represents concatenation performed in the channel dimension, and SE represents an SE module. The original intention of proposing such solution is that geometric constraints (such as epipolar constraints) exist between correct matching pairs, while no geometric constraint exists between incorrect matching pair; and under the action of rich spatial transformation, matching pairs with the geometric constraints have geometric transformation consistency during a transformation process.

Figure 5:
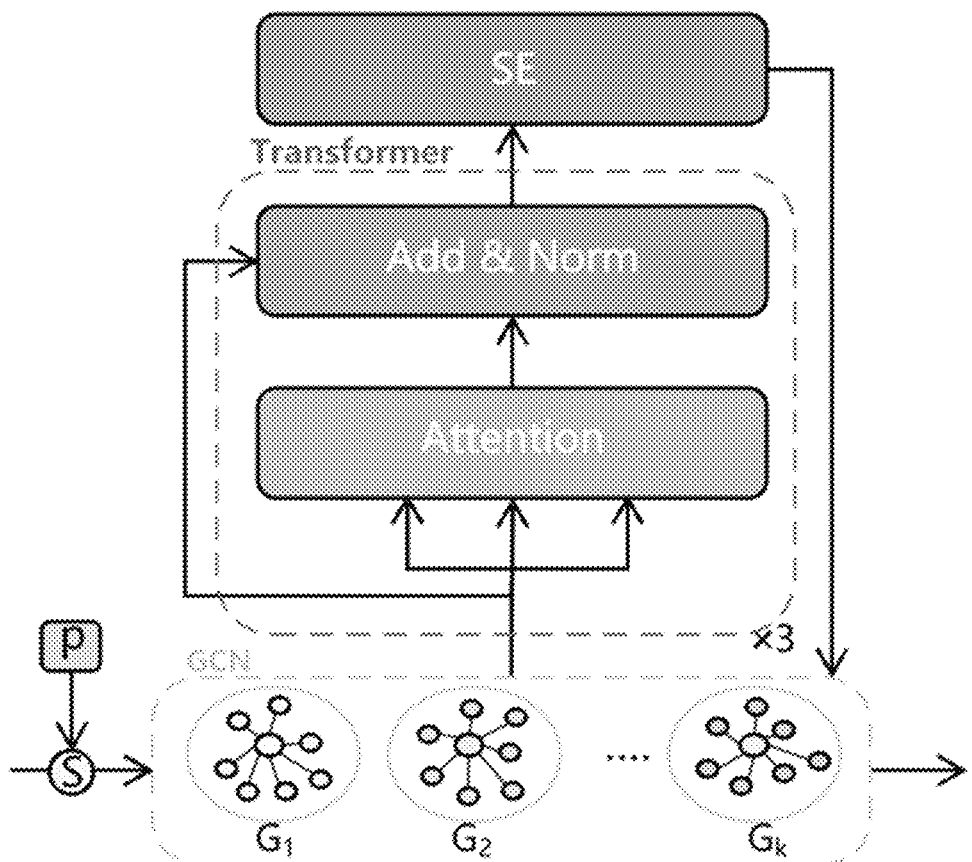
FIG. 5 is a structural block diagram of a geometric semantic attention module provided by the present invention.

Further referring to FIG. 5, as a preferred solution, in this embodiment, the geometric semantic neighbor information is acquired by the geometric semantic attention module, and an acquisition step includes:

dividing all matching pairs in the input data of the next stage network into k categories based on probability data output by the previous stage network, where the matching pairs in each category are neighbors to each other;

constructing a category graph for each category, the category graph including a plurality of category nodes;

aggregating neighbor information of various categories to the category nodes; and performing an attention operation on all category nodes by a converter model, and performing a channel refinement operation by a channel attention module to obtain the geometric semantic neighbor information.

Input matching pair set for the next stage is divided into k categories based on the probability of matching pairs output by each stage, and the matching pairs in each category are neighbors to each other. A category graph is constructed for each category, and then neighbor information of various categories is aggregated into category nodes. Then, Transformer is adopted to perform attention operations on all category nodes. Finally, the SE module is adopted to perform channel refinement on the category nodes, category node features obtained after channel refinement are fused with all matching pair features in this category, so that all matching pairs have both neighbor information and global information.

Further, as a preferred solution, in this embodiment, the acquiring a camera pose result based on the optimized matching set specifically includes:

using an eight-point weight algorithm to calculate an essential matrix to estimate a camera pose in combination with probabilities of the matching pairs.

Further, as a preferred solution, in this embodiment, a plurality of feature point coordinates and corresponding feature descriptors for the first image and the second image are acquired respectively; a similarity between each feature point between the first image and the second image is obtained based on the feature descriptors, matching is performed according to the similarity to obtain a plurality of matching pairs, and the initial matching set is further generated. Preferably, feature points of two different images of the same scene are respectively extracted using an SIFT algorithm to obtain feature point coordinates and corresponding descriptors; a similarity between the feature points of the two images is calculated by using a nearest neighbor algorithm through the feature point descriptors; and matching is performed according to the similarity to obtain a plurality of matching pairs, and the initial matching set is further obtained.

Figure 6:
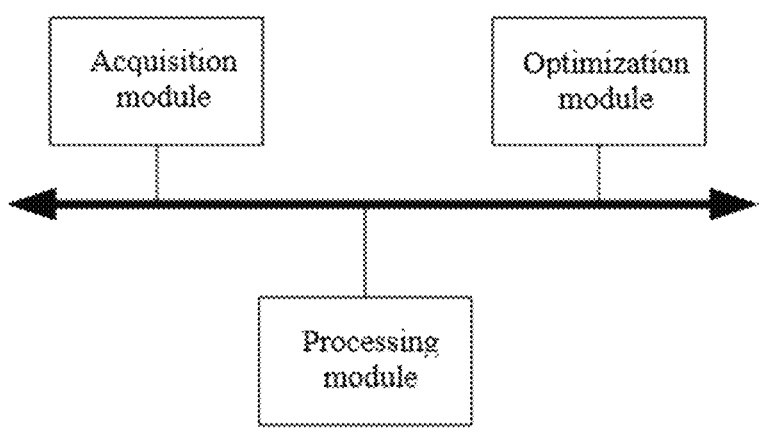
FIG. 6 is a structural block diagram of a camera pose estimation system provided by the present invention.

Correspondingly, referring to FIG. 6, the present invention further provides a camera pose estimation system, including:

an acquisition module, configured to acquire an initial matching set between a first image and a second image, where the first image and the second image are images from different angles for a same scene; specifically, the initial matching set can be generated by inputting the first image and the second image into the acquisition module, or can be transmitted to the acquisition module through other upper computers which are preferably smart equipment such as mobile phones and computers.

an optimization module, configured to perform a mismatch removal operation on the initial matching set based on an optimization network to obtain an optimized matching set, where the optimization network is constructed based on a multi-stage geometric semantic attention network; and a processing module, configured to acquire a camera pose result based on the optimized matching set.

Correspondingly, the present invention further provides electronic equipment, including:

a memory, having a computer program stored; and a processor, configured to implement the camera pose estimation method when executing the computer program.

Correspondingly, the present invention further provides a computer-readable medium, having a computer program stored, where the computer program, when executed by a processor, implements the camera pose estimation method.

More specific examples of the computer-readable storage medium may include but not limited to: an electrical connection having one or more wires, a portable computer diskette, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof.

In the present application, the computer-readable storage medium may be any tangible medium that contains or stores a program for use by or in combination with an instruction execution system, apparatus, or device. However, in the present application, the computer-readable signal medium may include a data signal that is propagated in baseband or as part of a carrier wave, in which computer-readable program code is carried. Such a propagated data signal may be in a variety of forms, including but not limited to, an electromagnetic signal, an optical signal, or any suitable combination thereof.

It should be understood that for those of ordinary skill in the art, equivalent substitutions or changes can be made in accordance with the technical solution of the present invention and the inventive concept thereof, and all such changes or substitutions shall fall within the protection scope of the claims appended to the present invention.

What is claimed is:

1. A camera pose estimation method, comprising:

acquiring an initial matching set between a first image and a second image, wherein the first image and the second image are images from different angles for a same scene;

performing a mismatch removal operation on the initial matching set based on an optimization network to obtain an optimized matching set, wherein the optimization network is constructed based on a multi-stage geometric semantic attention network; the multi-stage geometric semantic attention network comprises a plurality of stage networks sequentially connected in series; adjacent stage networks are connected to each other through a geometric transformation consistency processor and a geometric semantic attention processor; the stages comprise a first multi-branch processor, a sequential perception filtering processor, and a second multi-branch processor that are sequentially connected in series; the first multi-branch processor and the second multi-branch processor are constructed using a multi-branch structure; the multi-branch structure comprises a first transformation processor MBSE and a second transformation processor MBMS; the geometric transformation consistency processor is configured to extract geometric transformation consistency information of output data of a previous stage network; and the geometric semantic attention network is configured to acquire geometric semantic neighbor information of input data of a next stage network; and acquiring a camera pose result based on the optimized matching set.

2. The camera pose estimation method according to claim 1, wherein the performing a mismatch removal operation on the initial matching set based on an optimization network to obtain an optimized matching set specifically comprises:

acquiring probability data of the initial matching set based on the stage networks, wherein the probability data comprises a correct matching probability of each matching pair in the initial matching set; input data of each of the stage networks is the initial matching set, and input data of posterior stage networks is also fused with geometric transformation consistency information output by the geometric transformation consistency processor and geometric semantic neighbor information output by the geometric semantic attention processor; and optimizing the initial matching set based on probability data output by a final stage network to obtain the optimized matching set.

3. The camera pose estimation method according to claim 2, wherein the acquiring probability data of the initial matching set based on the stage networks specifically comprises:

acquiring a first spatial transformation feature of the initial matching set;

performing a sequential perception filtering operation on the first spatial transformation feature to acquire a second spatial transformation feature corresponding to the first spatial transformation feature; and obtaining the correct matching probability of each matching pair in the initial matching set based on the second spatial transformation feature.

4. The camera pose estimation method according to claim 2, wherein a step of acquiring the geometric transformation consistency information comprises:

extracting the geometric transformation consistency information of the output data of the previous stage network based on the geometric transformation consistency processor.

5. The camera pose estimation method according to claim 2, wherein a step of acquiring the geometric semantic neighbor information comprises:

dividing all matching pairs in the input data of the next stage network into k categories based on probability data output by the previous stage network, wherein the matching pairs in each category are neighbors to each other;

constructing a category graph for each category, the category graph comprising a plurality of category nodes;

aggregating neighbor information of various categories to the category nodes; and performing an attention operation on all category nodes by a converter model, and performing a channel refinement operation by a channel attention processor to obtain the geometric semantic neighbor information.

6. The camera pose estimation method according to claim 3, wherein the acquiring a camera pose result based on the optimized matching set specifically comprises:

using an eight-point weight algorithm to calculate an essential matrix to estimate a camera pose in combination with probabilities of the matching pairs.

7. The camera pose estimation method according to claim 1, wherein a plurality of feature point coordinates and corresponding feature descriptors for the first image and the second image are acquired respectively; a similarity between each feature point between the first image and the second image is obtained based on the feature descriptors, matching is performed according to the similarity to obtain a plurality of matching pairs, and the initial matching set is further generated.

8. A camera pose estimation system, comprising:

an acquisition processor, configured to acquire an initial matching set between a first image and a second image, wherein the first image and the second image are images from different angles for a same scene;

an optimization processor, configured to perform a mismatch removal operation on the initial matching set based on an optimization network to obtain an optimized matching set, wherein the optimization network is constructed based on a multi-stage geometric semantic attention network; the multi-stage geometric semantic attention network comprises a plurality of stage networks sequentially connected in series; adjacent stage networks are connected to each other through a geometric transformation consistency processor and a geometric semantic attention processor; the stages comprise a first multi-branch processor, a sequential perception filtering processor, and a second multi-branch processor that are sequentially connected in series; the first multi-branch processor and the second multi-branch processor are constructed using a multi-branch structure; the multi-branch structure comprises a first transformation processor MBSE and a second transformation processor module MBMS; the geometric transformation consistency processor is configured to extract geometric transformation consistency information of output data of a previous stage network; and the geometric semantic attention network is configured to acquire geometric semantic neighbor information of input data of a next stage network; and a processing processor, configured to acquire a camera pose result based on the optimized matching set.

9. An Electronic equipment, comprising:

a memory, having a computer program stored; and a processor, configured to implement the camera pose estimation method according to claim 1 when executing the computer program.

10. A non-transitory computer storage medium, having a computer program stored, wherein the computer program includes computer-executable instructions, when executed by a processor, implements the camera pose estimation method according to claim 1.

* * * * *